US012781061B2

(12) United States Patent
Wang

(10) Patent No.: US 12,781,061 B2
(45) Date of Patent: Nov. 3, 2026

(54) MODIFIED GRAPHENE AND GRAPHENE NANOPLATELET FOR ANTI-CORROSION COATINGS

(71) Applicant: NanoXplore Inc., Montreal (CA)

(72) Inventor: Liya Wang, Lansing, MI (US)

(73) Assignee: NanoXplore Inc., Montreal (CA)

( * ) Notice: Subject to any disclaimer, the term of this patent is extended or adjusted under 35 U.S.C. 154(b) by 1004 days.

(21) Appl. No.: 17/798,353

(22) PCT Filed: Feb. 3, 2021

(86) PCT No.: PCT/US2021/016300
§ 371 (c)(1),
(2) Date: Aug. 9, 2022

(87) PCT Pub. No.: WO2021/158590
PCT Pub. Date: Aug. 12, 2021

(65) Prior Publication Data
US 2023/0092502 A1 Mar. 23, 2023

Related U.S. Application Data

(60) Provisional application No. 62/969,271, filed on Feb. 3, 2020.

(51) Int. Cl.
*C09D 5/10* (2006.01)
*C08K 3/04* (2006.01)
(Continued)

(52) U.S. Cl.
CPC ............... *C09D 5/106* (2013.01); *C09D 7/61* (2018.01); *C09D 7/70* (2018.01); *C09D 133/08* (2013.01);
(Continued)

(58) Field of Classification Search
None
See application file for complete search history.

(56) References Cited

U.S. PATENT DOCUMENTS 9,982,142 B2 5/2018 Liu et al.
10,150,874 B2 12/2018 Böhm et al.
(Continued)

FOREIGN PATENT DOCUMENTS

CN 105860709 A * 8/2016
CN 107828309 A * 3/2018 ........... C09D 163/00
(Continued)

OTHER PUBLICATIONS

Int'l Search Report for PCT/US2021/016300, dated May 21, 2021.
(Continued)

*Primary Examiner* — Joseph D Anthony

(57) ABSTRACT

A graphene-based zinc containing coating is provided to prevent or slow down the corrosion of steel. The graphene-based materials are selected from a group of modified single-layer graphene, double-layer graphene, few layer graphene, graphene nanoplatelet, doped graphene, and a combination thereof. The modified graphene-based materials in zinc-containing paints or coatings act as a barrier to prevent or slow down the diffusion of corrosive species to the steel surface to be protected. For such a purpose, the graphene has a high aspect ratio and good structural integrity, especially a lack of defects on the basal plane of the graphene.

20 Claims, 1 Drawing Sheet

(51) Int. Cl.

| | |
|---|---|
| ***C08K 3/08*** | (2006.01) |
| ***C09D 7/40*** | (2018.01) |
| ***C09D 7/61*** | (2018.01) |
| ***C09D 133/08*** | (2006.01) |
| ***C09D 163/00*** | (2006.01) |
| ***C09D 167/02*** | (2006.01) |
| ***C09D 175/04*** | (2006.01) |

(52) U.S. Cl.

CPC ......... *C09D 163/00* (2013.01); *C09D 167/02* (2013.01); *C09D 175/04* (2013.01); *C08K 3/042* (2017.05); *C08K 2003/0893* (2013.01)

(56) References Cited

U.S. PATENT DOCUMENTS

| | | | | |
|---|---|---|---|---|
| 2010/0092809 | A1 | 4/2010 | Drzal et al. | |
| 2016/0280931 | A1* | 9/2016 | Liu | C09D 5/106 |
| 2016/0312038 | A1* | 10/2016 | Böhm | C23C 26/00 |
| 2018/0319996 | A1* | 11/2018 | Virtanen | C07D 303/30 |

FOREIGN PATENT DOCUMENTS

| | | | | |
|---|---|---|---|---|
| CN | 107974170 | A * | 5/2018 | |
| CN | 108948956 | A * | 12/2018 | |
| CN | 108997893 | A * | 12/2018 | |
| CN | 109233565 | A * | 1/2019 | C09D 7/61 |
| KR | 1020190050022 | A | 5/2019 | |

OTHER PUBLICATIONS

Davidson, R. D. et al., "Tortuosity but not percolation: design of exfoliated graphite nanocomposite coatings for extended corrosion protection of aluminum alloys", ACS Applied Nano Materials, 2019, vol. 2, No. 5, pp. 3100-3116.

Kumar, M. K. P. et al., "Electrochemical behavior of Zn-graphene composite coatings", RSC Advances, 2015, vol. 5, No. 32, pp. 25603-25608.

International Written Opinion for Application No. PCT/US2021/016300, dated May 21, 2021, 5 pages.

Toh et al., "Graphene oxides exhibit limited cathodic potential window due to their inherent electroactivity," The Journal of Physical Chemistry C, 115(36), Sep. 2011, pp. 17647-17650.

* cited by examiner

MODIFIED GRAPHENE AND GRAPHENE NANOPLATELET FOR ANTI-CORROSION COATINGS

CROSS REFERENCE TO RELATED APPLICATIONS

This application is a U.S. National Phase application, filed under 35 U.S.C. § 371, of International Application No. PCT/US2021/016300, filed Feb. 3, 2021, which claims the benefit and priority of U.S. Provisional Patent Application Ser. No. 62/969,271, filed Feb. 3, 2020, the contents of which are incorporated herein by reference.

TECHNICAL FIELD

The present invention generally relates to the field of materials and formulations, and more specifically to modified graphene nanoplatelets for anti-corrosion coatings.

BACKGROUND

Corrosion is a process that deteriorates a material due to reactions of the material with its surrounding environment. Corrosion is an irreversible interfacial reaction of a material, especially metals, with corrosive species that either consumes the material or makes it dissolve in a media of the environment. Very often, corrosion involves converting a metal to a more stable chemical status, which is usually in the form of an oxide, hydroxide, sulfate, or other compounds.

Corrosion causes huge losses for many industries such as infrastructures, industrial equipment, transportation vehicles, ocean containers and liners, oil storage tanks and pipelines, and consumer appliances. The global cost of corrosion has been estimated to be more than 3% of the global Gross Domestic Production (GDP). Therefore, corrosion has a huge negative impact to the economy.

There are many ways in which a metal can react with corrosive species, but corrosion is basically certain type of oxidation of the metal. From the mechanism point of view, corrosion can be classified into three categories: chemical, physical and electrochemical.

Chemical corrosion is a form of corrosion that is based on chemical reactions but not accompanied by generation of electric current. Chemical corrosions are purely subjected to the basic laws of chemical kinetics of heterogeneous reactions. Examples are corrosions of metals in non-electrolytes or in dry gases.

Physical corrosion is a form of corrosion such as those that occur when some solid metals are in contact with a liquid metal. In most cases, the solid metal dissolves to form an alloy with the molten metal. In some instances of physical corrosion, the corrosive attack on solid metal is due to penetration of the liquid metal into the grain boundaries of the solid metal.

Electrochemical corrosion are corrosions that occur electrochemically. An electrochemical corrosion occurs when electrons from atoms at the surface of a metal are transferred to a suitable electron acceptor or depolarizer. Electrochemical corrosion involves two reactions and the presence of an electrolyte. Among them, electrochemical corrosion is the most common and impactful form of corrosion. Corrosions occur in many types including:

Uniform corrosion: Uniform corrosion is often a result of dry chemical reactions such as with atmosphere or gases. Uniform corrosion usually occurs evenly over the entire surface of a metal part or structure at a steady rate. Uniform corrosion can be easily detected, monitored, and predicted, making disastrous failures relatively rare. However, loss due to this type of corrosion is not small given the large volume of metals used and surfaces exposed. Major mitigations for this type of corrosions are surface treatment, coating, or painting.

Galvanic corrosion: Galvanic corrosion is an electrochemical process in which one metal corrodes preferentially when it is in electrical contact with another metal, in the presence of an electrolyte. Dissimilar metals and alloys have different electrochemical potentials. When two or more metals come into contact in an electrolyte, one metal acts as anode and the other as cathode. The potential difference between the reactions at the two electrodes is the driving force for the reactions at the two metals. The corrosion mainly occurs at the anode where the metal is oxidized and often dissolved in the electrolyte. This leads to the metal at the anode corroding more quickly than it otherwise would and corrosion at the cathode being inhibited. The presence of an electrolyte and an electrical conducting path between the metals is essential for galvanic corrosion to occur. The electrolyte provides a means for ion migration whereby ions move to prevent charge build-up that would otherwise stop the reaction.

Crevice corrosion: Crevice corrosion is the corrosion that occurs in confined spaces to which the access of the working fluid from the environment is limited. These confined spaces are generally called crevices. Examples of crevices are gaps and contact areas between parts, under gaskets or seals, inside cracks and seams, spaces filled with deposits, and under sludge piles. Crevice corrosion is also electrochemical in nature, similar to galvanic corrosion. The major difference is that galvanic corrosion usually involves two different metals and an electrolyte, whereas crevice corrosion involves one metal part and two connected environment, which is often initiated as a result of changes in local chemistry inside the crevice. For example, oxygen diffusion into a crevice might be restricted due to the stagnant nature of the fluid in a crevice, making it more anodic on the metal surface than that outside of crevice. This causes potential difference inside and outside of the crevice and formation of an electrochemical cell as the anode and cathode is connected by the same piece of metal.

Pitting corrosion: Pitting corrosion is an extremely localized form of corrosion by which cavities or “holes” are produced in the material. The mechanism for pitting corrosion is similar to crevice corrosion. The pitting corrosion is an autocatalytic process where inside the pit, which could be initiated by a damage or breakdown of the metal surface, the metal dissolves into the electrolyte and acts as an anode. The metal surface outside of the pit works as the cathode where oxygen is reduced. Pitting is considered to be more dangerous than uniform corrosion damage because it is more difficult to detect, predict, and design against. Corrosion products often cover the pits. A small and narrow pit with minimal overall metal loss can lead to the failure of an entire engineering system.

Microbiological corrosion: Microbiological corrosion is a corrosion that is influenced by the growth of micro-organisms, either directly or indirectly. One example is the corrosion caused by sulfate reducing bacteria (SRB).

Major corrosion agents include salt water, $H_2S$ which is a weak acid but very corrosive as a source of $H^+$, $CO_2$ which becomes acid when hydrated and causes pitting corrosion, oxygen, bacteria, and various acids.

Obviously, one major approach to fight corrosion is to prevent the corrosive species to reach the surfaces of the metal to be protected. Another approach is to make the surface more robust. Yet another approach is to use a sacrificial component so that it is preferably corroded thereby protecting the main metal. These approaches can be achieved by surface treatment, surface platting, and surface coating. Among the approaches, surface coating is the most common method. Anti-corrosion paints and coatings are relatively effective and inexpensive ways for corrosion protection. They are generally based upon barrier protection, inhibitive coatings, or anodically active metal coatings.

Barrier protection coatings create barriers between substrate materials and the environment. Barrier protection coatings often use a polymeric resin to prevent corrosive species from reaching the metal to be protected. Additional additives may be added to provide other functions. Barrier coatings need to be chemically resistive and they should have good wetting and adhesion to the substrates.

Inhibitive coatings alter the chemistry at the surface of the metal substrate. Inhibitive coatings are usually made up of pigments that actively impede chemical reactions. Inhibitive coatings were designed to keep corrosion from ever starting. It is done by interfering with the electrolytes required to start the corrosion process. Inhibitive coatings generate a passivation layer on the metal they protect, which prevents the contact with water, chemicals, and other corrosive species.

Anodically active metal or sacrificial coatings usually contain zinc which corrodes more preferentially than steel. The zinc sacrificially corrodes to protect steel. In the process, it also forms a corrosion product that provides further protection similar to a barrier coating. Zinc-based coatings have been used for decades by many industries for the corrosion protection of steel-based structures and consumer goods.

Recently, graphene, as a new class of nano-carbon material, has been considered as a potential candidate for anti-corrosion coating applications due to its unique two-dimensional morphology, excellent barrier property, superior chemical resistance, excellent mechanical strength, and other attributes. More specifically, graphene in anti-corrosion coatings can help create a tortuous path for corrosive species, slowing down their diffusion to the metal surface, and reducing the corrosion reactions. The key is to effectively disperse graphene with proper morphology and size, surface area, and surface chemistry in the coating. The graphene material must have a proper flake morphology, size, and surface area. Too large a flake size may cause poor coating quality which could worsen the corrosion. A relatively high surface area is needed as it relates to the thickness of the graphene and hence the number of particles per unit weight. Proper surface modification is often needed to better interact with solvent or the resin in the formulation to obtain effective dispersion and coating quality. Moreover, surface functionalization may also change the conductivity of the graphene material, which can also affect the anti-corrosion performance depending on the protection mechanism of the formulation.

U.S. Pat. No. 9,982,142 disclosed a zinc-rich epoxy anti-corrosion coating containing graphene where the graphene was obtained by oxidizing graphite and then exfoliating, wherein the oxidization method was selected from any one of Hummers method, Staudenmaier method or Brodie method; and the exfoliation method is selected from any one of microwave exfoliation, pyrolysis expansion exfoliation, or ultrasonic dispersion. Such graphene oxide-based materials, however, usually have a high concentration of defects on the basal plane, thereby reducing the barrier property. Furthermore, graphene oxide (GO) is highly hydrophilic and easy to absorb and transport moisture. While the reduction of GO can change its hydrophilic nature, it will not repair the defects and cannot improve the barrier property.

U.S. Pat. No. 10,150,874 taught a graphene-based anti-corrosion coating where a steel strip or sheet is coated with zinc or zinc alloy first and a graphene containing film is then coated onto the zinc coating before a final top coating is applied. Such a practice, however, is complicated and expensive as it involves both zinc coating and a graphene barrier coating.

Zinc-rich coatings are widely used as primers in high-performance multi-coat systems and for repair of batch hot-dip galvanized coatings. These graphene-based coatings have demonstrated improved corrosion protection when compared to carbon steels protected only by spray-applied organic coatings, such as an epoxy-urethane coating system. In some mild environments, inorganic zinc paint may be used independently for corrosion protection, but it is usually top coated in more severe environments to extend service life.

For zinc-rich sacrificial coatings, the actual protection mechanism involves three stages: (i) Initial barrier stage: The zinc-rich coating is usually a continuous film, which effectively isolates the substrate from the environment. At this stage, the coating behaves like any other barrier coating with or without zinc. (ii) Sacrificial protection stage: Once a defect is made in the coating, which exposes the substrate, the zinc starts to provide a certain amount of sacrificial protection. This protection depends on the amount and type of moisture present, the electrical connectivity of the zinc particles to each other and the substrate, the purity of the zinc, and other factors. Note that zinc particles need to be electrically connected to the substrate to provide sacrificial reaction. For highly zinc-loaded coatings, this is not of a problem since zinc metal has good electric conductivity.

For low zinc content formulations, however, the electric connectivity and hence the protection efficiency might become an issue. Conventional zinc-rich anti-corrosion primers or paints contain high zinc content, often more than 80-90%. It's desirable to reduce the zinc content without sacrificing the anti-corrosion performance. One motivation is to reduce the toxic zinc vapor in painting shops. The other reason is to reduce the cost. The industry wants to reduce zinc content to below 30-50%. Reducing the zinc content to such a low level, however, may cause the zinc to lose the particle-particle contact, thereby reducing its effectiveness of sacrificial protection.

Graphene has been used to help reduce the zinc content in zinc-based anti-corrosion coatings. When zinc content is significantly reduced, as in many zinc-graphene system, the issue becomes more complicated due to the fact that graphene can help provide conductivity, but it is also a noble material that can corrode steel Thus there exists a need for improved anti-corrosion coatings based on modified graphene nanoplatelets. There is also a need for graphene-based coatings for anti-corrosion applications where both zinc powder and graphene are formulated in the same coating.

SUMMARY OF THE INVENTION

An anti-corrosion paint or coating is provided based on modified graphene nanoplatelets. The anti-corrosion paint or coating includes a graphene-based material, a sacrificial zinc metal or compound, and a resin where the resin contains the graphene-based material and the sacrificial zinc metal or compound.

A method is provided for forming an anti-corrosion paint or coating. The method includes mixing graphene-based materials, a sacrificial zinc metal or compound, and a resin to form the paint or coating, where the graphene-based materials are first dispersed in a solvent to form a dispersion or a wet cake.

A method is provided for forming an anti-corrosion paint or coating. The method includes mixing graphene-based materials, a sacrificial zinc metal or compound, and a resin to form the paint or coating, wherein the graphene-based materials are a dry powder.

BRIEF DESCRIPTION OF THE DRAWINGS

The present invention is further detailed with respect to the following drawing that is intended to show certain aspects of the present of invention, but should not be construed as limit on the practice of the invention, wherein.

DETAILED DESCRIPTION

Figure 1:
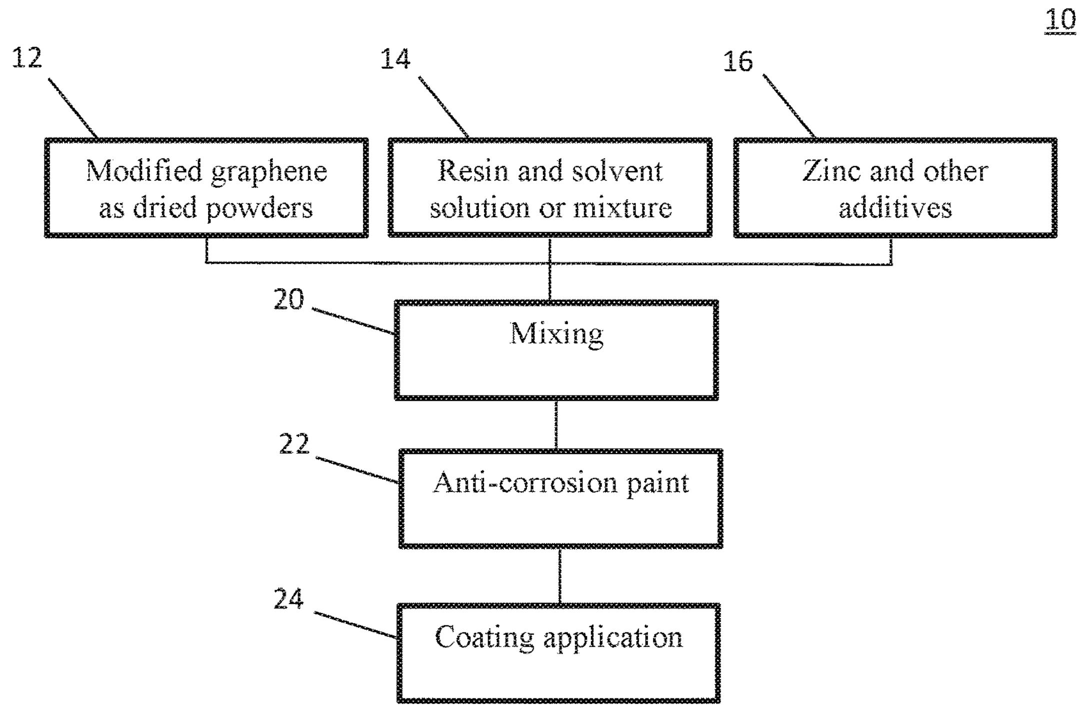
FIG. 1 is a flowchart of a method for preparing and applying a graphene-based zinc-containing anti-corrosion paint when graphene is applied as a dry powder in accordance with embodiments of the invention.

The present invention has utility as a graphene-based zinc containing coating to prevent or slow down the corrosion of steel. The graphene-based materials are selected from a group of modified single-layer graphene, double-layer graphene, few layer graphene, graphene nanoplatelet, doped graphene, and a combination thereof.

In some inventive embodiments, the graphene-based material is oxygen-functionalized graphene nanoplatelet. The graphene nanoplatelet is produced by mechanical exfoliation with a surface area of ≥150 $m^2/g$. Preferably, the surface area of the graphene nanoplatelet is ≥300 $m^2/g$, more preferably ≥500 $m^2/g$. The particle size of the graphene nanoplatelet on average is ≤5 microns, and preferably ≤2 microns, and yet more preferably ≤1 micron. The thickness of the graphene nanoplatelet on average is ≤20 layers, preferably ≤15 layers, and yet more preferably between 2-10 layers. The graphene nanoplatelet described above gives good particle count, aspect ratio, and coating quality in anti-corrosion coatings, especially for relatively thin coatings.

In another inventive embodiment, the graphene-based material is oxygen-functionalized graphene nanoplatelet. The graphene nanoplatelet is produced by wet chemical exfoliation of graphite. The surface area of the material is ≥40 $m^2/g$, preferably ≥100 $m^2/g$, and yet more preferably ≥150 $m^2/g$. The particle size of the graphene nanoplatelet on average is ≤25 microns, and preferably ≤10 microns, and yet more preferably ≤5 micron. The thickness of the graphene nanoplatelet on average is ≤60 layers, preferably ≤20 layers, and yet more preferably between 5-15 layers. The graphene nanoplatelet described above gives good aspect ratio, good electrical conductivity, and decent coating quality in anti-corrosion coatings, especially for relatively thick coatings.

In some inventive embodiments, a combination of both mechanically exfoliated graphene nanoplatelet and chemically exfoliated graphene nanoplatelet are used.

In some inventive embodiments, the graphene nanoplatelet is functionalized with oxygen. The functionalization can be done by plasma, wet chemistry, or other methods. The oxygen content in the modified graphene nanoplatelet is between 2-20 atmospheric percent (at. %), preferably between 4-15 at. %, and more preferably between 5-10 at. %.

In some inventive embodiment, the graphene nanoplatelet may be functioned with other chemical groups including, but are not limited to, epoxide, carbonyl, carboxyl, hydroxyl, and amine, etc. Yet in another embodiment, the graphene-based material is modified by grafting one or more of polymer molecules to the surface of graphene to obtain proper electrochemical, electric, and barrier properties.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

One aspect of the instant invention is to use modified graphene-based materials in zinc-containing paints or coatings as a barrier to prevent or slow down the diffusion of corrosive species to the steel surface to be protected. For such a purpose, it is desirable to have a graphene with high aspect ratio and good structural integrity, especially a lack of defects on the basal plane of the graphene. Graphene oxide (GO) may not be desirable due to such defects as a result of its manufacturing process. Reduced graphene oxide (rGO) will not solve this problem.

Another aspect of the instant invention is to use the graphene-based materials to provide enough conductivity to help form a conductive network that connects zinc particles for better utilization and protection, especially when zinc content is reduced to below 30-50 wt % in the coatings. For this purpose, graphene oxide and heavily functionalized graphene might not be good candidates since they usually do not have good electric conductivity. Graphene, graphene nanoplatelet, or reduced graphene oxide could provide such conductivity.

Yet another aspect of the instant invention is to use a modified graphene whose electrochemical potential has been significantly shifted to a level that it will not electrochemically corrode steel. Pure graphene, like graphite, has a very positive reduction potential and in theory can corrode all metals with the presence of an electrolyte by forming an electrochemical cell between the metal and graphene. Therefore, graphene needs to be modified to an extent that its reduction potential is more negative than the metal to be protected.

Graphene oxide contains many oxygen functionalities such as carboxyl, carbonyl, hydroxyl, epoxy, and peroxy moieties with a carbon:oxygen ratio of approximately 2:1. Most of these oxygen-containing groups are electroactive, resulting in an electrochemical activity or potential of graphene oxide different from pure graphene. It was reported that graphite oxide and chemically reduced graphene oxide (CRGO) exhibit large reduction currents starting at −0.75 V and increasing to −1.4 V versus an Ag/AgCl reference electrode[1]. Given that most types of steel have a reduction potential in the range of −0.07 to −0.53V (Ag/AgCl reference electrode), graphene oxide is not likely to corrode steel, much different from graphite or graphene. Therefore, it is desirable to modify graphene-based materials with oxygen or other functional groups so that their reduction potential is shifted away from directly corroding steel, yet the material is still electrically conductive enough to connect sacrificing zinc particles for more effective steel protection.

It is the combination of all the three aspects that makes the instant invention unique. In one exemplary inventive embodiment, oxygen functionalized graphene nanoplatelets are used in zinc-containing anti-corrosion primer coating. Preferably, the graphene nanoplatelets are manufactured by mechanical or thermal exfoliation of graphite instead of by a graphene oxide route. The materials are further functionalized with oxygen or other functional groups in a controlled manner so that the overall oxygen content is between 5-20 wt %. More preferably, the oxygen content is between 5-15 wt %, and yet more preferably, the oxygen content is between 5-10 wt %.

As used herein, graphene-based material is defined as a two dimensional material constructed by close-packed carbon atoms including a single-layer graphene, double-layer graphene, few layer graphene, graphene nanoplatelets, functionalized graphene, doped graphene, graphene oxide, reduced graphene, and a combination thereof.

As used herein, single-layer graphene is defined as a single layer of close-packed carbon atoms.

As used herein, double-layer graphene is defined as a stack graphene of two layers.

As used herein, few layer graphene, is defined as a stack graphene of 3-10 layers.

As used herein, graphene nanoplatelet is defined as a stack of graphene of more than 10 layers.

As used herein, graphene oxide is defined as one or more graphene layers with various oxygen-containing functionalities such as epoxide, carbonyl, carboxyl, and hydroxyl groups and a typical C:O ratio around 2.

As used herein, reduced graphene oxide is defined as graphene oxide that has been chemically or thermally reduced with a total oxygen content of typically in the range of 10%-30 atmospheric percent (at. %) depending on the extent of reduction.

As used herein, functionalized graphene is defined as graphene, few layer graphene, graphene nanoplatelets, graphene oxide, and reduced graphene oxide that are attached certain functional groups at their surfaces or edges. The functional groups include, but are not limited to, epoxide, carbonyl, carboxyl, hydroxyl, and amine, etc.

As used herein doped graphene is defined as graphene and graphene oxide that are doped in their crystal structures of certain metallic or non-metallic elements such as nitrogen, fluorine, oxygen, etc. The graphene materials can be made by chemical or mechanical exfoliation of graphite. The graphene materials can also be made by oxidizing graphite with or without a reduction step.

Among them, graphene nanoplatelet is a preferred reinforcement filler wherein the graphene nanoplatelet is a new type of nanoparticles made from graphite. These nanoparticles consist of small stacks of graphene that are 1 to 15 nanometers thick, with diameters ranging from sub-micrometer to 100 micrometers. U.S. Patent Publication 2010/0092809 describes an exemplary process for forming exfoliated graphite nanoparticles.

In some inventive embodiments, additional additives can be used in combination with the aforementioned graphene-based materials. Such additives include carbon, carbon black, graphite, carbon nanotube, metals, ceramics, and polymeric materials. Additional additives common to the industry are readily accommodated by an inventive formulation with these additives typically including but not limited to, metallic zinc particles or zinc-based compounds, dispersants, talc, barium sulfate, coupling agent, wetting agent, and curing agent.

Embodiments of the invention provide a method to prepare a graphene-based zinc-containing anti-corrosion paint or coating. The graphene-based materials are dispersed in a resin, together with other components to form a paint formulation with a graphene content of <10 wt %, preferably <5 wt %, more preferably <1 wt %, and yet more preferably <0.5 wt %. The resin includes, but is not limited to epoxy, polyurethane, acryic, alkyd, and other polymeric materials. The other components include, but not limited to, solvents, metallic zinc particles or zinc-based compounds, dispersants, talc, barium sulfate, coupling agent, wetting agent, and curing agent. It is appreciated that the resin is curable by a variety of mechanisms including free radical, light, oxygen exclusion, acid, heat, or combinations thereof. Curing agents and stabilizers consistent with a given resin are conventional available and operative herein as additives.

The formulation may be divided into two parts wherein Part A contains the resin and most of the formulation components and Part B contains mainly the curing agent. The two parts are mixed prior to the application for anti-corrosion coating. It is appreciated that the volume ratio between the Parts A and B routinely vary between 0.05-20:1. The two parts are routinely storage stable separately for time periods from weeks to several years with exclusion of light and maintenance of temperature at 20 degrees Celsius. Typically, part A includes resins optionally with fillers, thixotropes, solvent, and colorant, and a second component part (component B) that includes a curing agent and optionally a blend of fillers, solvent, and colorant.

An inventive formulation in certain embodiments includes a diluent that is otherwise unreactive and serves to modify the volume of the formulation. A diluent is defined herein as a miscible and non-reactive compound relative to the components of the part in which the diluent resides.

A cure inhibitor is optionally present in an inventive formulation. A cure inhibitor operative herein illustratively includes benzoquinone, naphthoquinone, hydroquinone, 4-hydroxy 2,2,6,6-tetramethylpiperidine 1-oxyl (TEMPOL) or TEMPO, halogenated tallow alkyl amines, aziridine, polyaziridines, dihydrocarbyl hydroxyl amine, 2,2,6,6-tetramethyl-piperidimyloxyl (TEMPO); 2,2,5,5-tetra-methyl-pyrolyloxy (PROXYL) or a combination thereof that operate synergistically to provide storage stability to an inventive formulation. Typically, a cure inhibitor is present from 0 to 0.2 total weight percent of Part A.

A cure accelerator is also present in an inventive formulation to kinetically speed curing of the formulation monomer compared to inventive formulations devoid of a cure accelerator. Cure of the monomers in contact with at least one substrate allows the formulation to function as an adhesive. Accelerators operative herein illustratively include a pyridine derivative, a butaraldehyde aniline condensate, N,N-dimethylaniline, N,N-dimethyltoludiene, N,N-diethyltoludiene, metal acetyl acetonate, and combinations thereof. Typically, cure accelerators are present from 0 to 2.5 total weight percent of Part A. In certain inventive embodiments, the cure accelerator is present in both Parts A and B; however, storage stability is generally enhanced by segregation of the cure accelerator in Part B and separate from any cure initiators in the inventive formulation, that are commonly in Part A.

Additives operative herein illustratively include a thixotrope, a silane coupling agent, a pigment, a plasticizer, an inert filler, a chain terminating agent, a fire retardant, and combinations thereof. Such additives are limited only by the requirement of compatibility with the other components of an inventive formulation.

In some inventive embodiments, the graphene-based materials can be added to the resin mix as a dry powder as shown in method 10 of FIG. 1. Graphene-based materials are used as a dry powder (Block 12). The graphene based dry powders are mixed (Block 20) with resin and solvent (Block 14) and other components illustratively including zinc and other additives (Block 16) in the paint formulation to obtain an anti-corrosion paint (Block 22). The mixing can be done by any of the conventional mixing equipment including high shear mixer, three-roll mill, attritor mill, high energy mill, double planetary mixer, nozzle mixer, cavity mixer, and other mixers. The paint can be applied (Block 24) to the surface of the articles to be protected by forming a coating. The coating can be done by brush coating, spray coating, roller coating, electro static spray coating, and any other conventional or unconventional coating methods.

Figure 2:
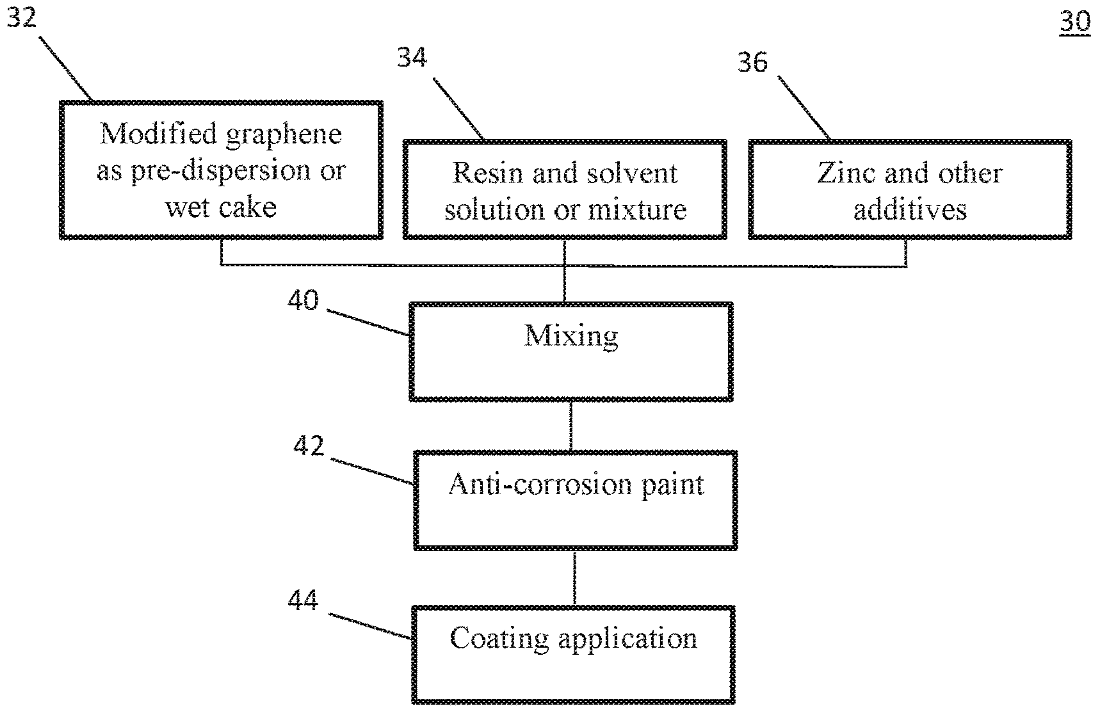
FIG. 2 is a flowchart of a method for preparing and applying a graphene-based zinc-containing anti-corrosion paint when graphene is applied as a pre-dispersion or wet cake in accordance with embodiments of the invention.

In some inventive embodiments, and more preferably, the graphene-based materials can be added to the resin mix as a pre-dispersion or a wet cake as shown in method 30 of FIG. 2. Graphene-based materials are first dispersed in a solvent to form a dispersion or a wet cake (Block 32). The dispersion or cake is then mixed (Block 40) with resin and solvent (Block 34) and other components illustratively including zinc and other additives (Block 36) in the paint formulation to obtain an anti-corrosion paint (Block 42). The mixing can be done by any of the conventional mixing equipment including high shear mixer, three-roll mill, attritor mill, high energy mill, double planetary mixer, nozzle mixer, cavity mixer, and other mixers. The paint can be applied (Block 44) to the surface of the articles to be protected by forming a coating. The coating can be done by brush coating, spray coating, roller coating, electro static spray coating, and any other conventional or unconventional coating methods.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

REFERENCES

1. Her Shuang Toh, Adriano Ambrosi, Chun *Kiang* Chua, and Martin Pumera, *J. Phys. Chem*. C 2011, 115, 17647-17650.

The invention claimed is:

1. A graphene-based and zinc containing anti-corrosion paint or coating comprising:

a graphene-based material comprising graphene nanoplatelets having a thickness of 5 to 15 layers and a surface area of at least 150 $m^2/g$;

a sacrificial zinc metal or compound; and a resin where the resin contains the graphene-based material and the sacrificial zinc metal or compound.

2. The paint or coating of claim 1 wherein the graphene-based material is made from mechanically or chemically exfoliated from graphite and functionalized with oxygen or other functionalities so that the paint or coating does not electrochemically corrode steel.

3. The paint or coating of claim 1 wherein the graphene-based material is one or more of graphene, bi-layer graphene, few layer graphene, graphene nanoplatelet, functionalized graphene, doped graphene, and a combination thereof.

4. The paint or coating of claim 1 wherein the resin comprises one or more of epoxy, polyurethane, acrylic, alkyd, and other polymeric compounds.

5. The paint or coating of claim 1 wherein the graphene-based material is functionalized by one or more of functional groups selected from epoxide, carbonyl, carboxyl, hydroxyl, and amine.

6. The paint or coating of claim 1 wherein the graphene-based material is modified by grafting a polymer to an edge or a surface of the graphene-based material.

7. The paint or coating of claim 1, wherein zinc is present as a combination of zinc metal, and a zinc compound.

8. The paint or coating of claim 1 wherein the graphene-based material is present with an oxygen content of 2-20 atomic percent.

9. The paint or coating of claim 1 wherein the graphene-based material is present with an oxygen content of 4-15 atomic percent.

10. The paint or coating of claim 1 wherein the graphene-based material is present with an oxygen content of 5-10 atomic percent.

11. The paint or coating of claim 1 wherein the graphene content in a formulation of the paint is in the range of 0.1-10 weight percent.

12. The paint or coating of claim 1 wherein the graphene content in a formulation of the paint is in the range of 0.5-5 weight percent.

13. The paint or coating of claim 1 wherein the graphene content in a formulation of the paint is in the range of 0.5-1 weight percent.

14. The paint or coating of claim 1 wherein the zinc content in a formulation of the paint is in the range of 20-90 weight percent.

15. The paint or coating of claim 1 wherein the zinc content in a formulation of the paint is in the range of 30-60 weight percent.

16. The paint or coating of claim 1 wherein the zinc content in a formulation of the paint is in the range of 30-50 weight percent.

17. The paint or coating of claim 1 wherein the zinc content in a formulation of the paint is in the range of 20-50 weight percent.

18. A method of forming the paint or coating of claim 1, the method comprising:

mixing the graphene-based material, the sacrificial zinc metal or compound, and the resin to form the paint or coating; and wherein the graphene-based material is first dispersed in a solvent to form a dispersion or a wet cake.

19. A method of forming the paint or coating of claim 1, the method comprising:

mixing the graphene-based material, the sacrificial zinc metal or compound, and the resin to form the paint or coating; and wherein the graphene-based material is a dry powder.

20. The method of claim 18 further comprising applying the paint or coating to a steel structure.

* * * * *